(12) United States Patent
Yasui et al.

(10) Patent No.: US 7,167,342 B2
(45) Date of Patent: Jan. 23, 2007

(54) MAGNETIC RECORDING MEDIUM, MAGNETIC RECORDING PLAYBACK DEVICE, AND INFORMATION PROCESSING DEVICE

(75) Inventors: Nobuhiro Yasui, Kanagawa (JP); Tohru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 450 days.

(21) Appl. No.: 10/813,004

(22) Filed: Mar. 31, 2004

(65) Prior Publication Data

US 2004/0196592 A1 Oct. 7, 2004

(30) Foreign Application Priority Data

Apr. 4, 2003 (JP) .............................. 2003-101111

(51) Int. Cl.
*G11B 5/82* (2006.01)
*G11B 5/66* (2006.01)

(52) U.S. Cl. ...................................... 360/135; 428/817
(58) Field of Classification Search .................... None
See application file for complete search history.

(56) References Cited

U.S. PATENT DOCUMENTS

| | | | | |
|---|---|---|---|---|
| 4,109,287 A | * | 8/1978 | Kawai et al. | 428/846.4 |
| 4,578,299 A | * | 3/1986 | Kato et al. | 428/848.7 |
| 4,588,653 A | * | 5/1986 | Wray | 428/600 |
| 4,671,978 A | * | 6/1987 | Kato et al. | 428/848.1 |
| 4,721,640 A | * | 1/1988 | Kato et al. | 428/848.1 |
| 5,085,911 A | * | 2/1992 | Kato et al. | 428/841.1 |
| 5,635,269 A | * | 6/1997 | Weir et al. | 428/848.1 |
| 6,088,199 A | * | 7/2000 | Lee et al. | 360/135 |
| 6,468,405 B1 | * | 10/2002 | Rou et al. | 204/298.11 |
| 6,569,294 B1 | * | 5/2003 | Khazanov et al. | 204/192.16 |
| 6,602,620 B1 | * | 8/2003 | Kikitsu et al. | 428/842.2 |
| 6,791,797 B1 | * | 9/2004 | Saito et al. | 360/136 |
| 6,804,081 B1 | * | 10/2004 | Den et al. | 360/97.01 |
| 6,852,431 B1 | * | 2/2005 | Fukutani et al. | 428/826 |
| 6,891,184 B1 | * | 5/2005 | Imai | 250/591 |
| 7,081,303 B1 | * | 7/2006 | Yasui et al. | 428/446 |
| 2001/0036563 A1 | | 11/2001 | Watanabe et al. | 428/694 T |
| 2003/0001274 A1 | | 1/2003 | Den et al. | 257/761 |
| 2003/0072971 A1 | | 4/2003 | Fukutanu et al. | 428/694 IS |

(Continued)

FOREIGN PATENT DOCUMENTS

JP 63007517 A * 1/1988

(Continued)

*Primary Examiner*—Andrea Wellington
*Assistant Examiner*—Christopher R. Magee
(74) *Attorney, Agent, or Firm*—Fitzpatrick, Cella, Harper & Scinto (57) ABSTRACT

A magnetic recording medium is provided while including a recording layer in which magnetic materials are in the shape of a circular cylinder and uniformity and size reduction are achieved simultaneously. The magnetic recording medium includes a recording layer and an electrode layer disposed on a substrate, wherein the recording layer and the electrode layer are disposed in the same plane. The above-described electrode layer is disposed adjacently to the end portion of the plane in which the recording layer on the substrate is disposed. A matrix surrounding magnetic material portions of the above-described recording layer contains alumina as a constituent provided by anodization of aluminum. Alternatively, the matrix surrounding the magnetic material portions of the above-described recording layer contains at least one of Si and Ge or an oxide thereof as a constituent.

9 Claims, 8 Drawing Sheets

U.S. PATENT DOCUMENTS

2003/0170416 A1  9/2003  Saito et al. ................ 428/65.3
2004/0048092 A1  3/2004  Yasui et al. ................ 428/642

FOREIGN PATENT DOCUMENTS

JP    11-200090    7/1999
JP    001-273622   11/2001
WO    WO 03-069677  8/2003

* cited by examiner

(a) Al IS ANODIZED (b) AlSi OR AlSiGe STRUCTURE IS USED

MAGNETIC RECORDING MEDIUM, MAGNETIC RECORDING PLAYBACK DEVICE, AND INFORMATION PROCESSING DEVICE

BACKGROUND OF THE INVENTION

1. Field of the Invention

The present invention relates to a magnetic recording medium, a magnetic recording playback device, and an information processing device.

2. Description of the Related Art

With respect to the information processing technology of magnetic disk devices and the like, a large increase in capacity is required with remarkable increases in the amount of information processing in recent years. In particular, the amount of recording information of hard disk per unit area is now on a pace to increase at an annual rate exceeding 60 percent. A future increase in the amount of recording information is also desired, and miniaturization and an increase in density are also required of portable and other recording devices.

Magnetic recording media previously used for hard disks are of longitudinal magnetic recording type, and the magnetization is recorded parallel to a disk surface. In this longitudinal magnetic recording type, demagnetization in the magnetic domain must be suppressed with an increase in density, and a magnetic recording layer must be thinned in order to generate a magnetic field above the medium for the purpose of detecting the magnetization state. Consequently, the volume per magnetic fine particle becomes extremely small, and the superparamagnetic effect becomes remarkable. That is, the energy for stabilizing the magnetization direction becomes smaller than the thermal energy, the recorded magnetization varies with time and, thereby, the record may be deleted. Therefore, in recent years, researches have been actively conducted on the shift from the longitudinal magnetic recording type to the perpendicular magnetic recording type capable of increasing the film thickness of the recording layer.

Figure 4A:
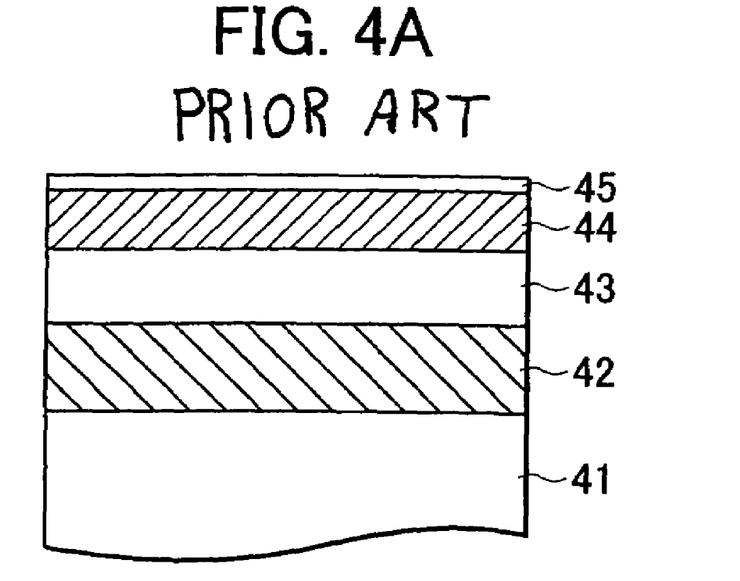
FIGS. 4A and 4B are schematic diagrams showing examples of known technologies with respect to magnetic recording media.
Figure 4B:
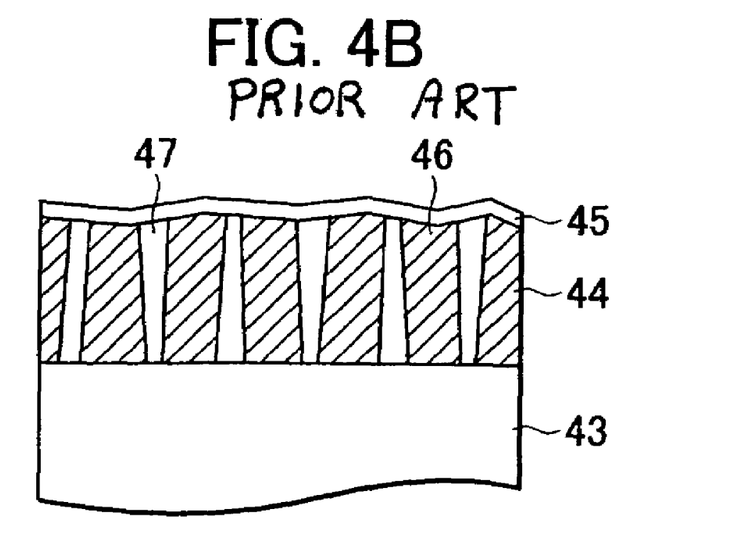

With respect to a medium for the perpendicular magnetic recording, as shown in FIG. 4A, a Co—Cr alloy is generally used as a recording layer 44, and when prepared by a sputtering method, as shown in FIG. 4B, the recording layer 44 grows while being separated into core portions 46 having a large Co content and shell portions 47 having a relatively large Cr content and surrounding the core portions. The core portion 46 is nearly in the shape of a circular cylinder, exhibits hard magnetism with a hexagonal close-packed lattice structure (hereafter referred to as an hcp structure), and becomes a recording portion. The shell portion 47 has a large Cr content, has a soft magnetic or non-magnetic property, and serves the function of weakening the interaction between adjacent core portions as well. In the core portion 46, the c axis points in the direction perpendicular to the substrate surface, and the magnetization points in the direction perpendicular to the substrate surface due to the action of the magnetocrystalline anisotropy. Besides Co—Cr, for example, Ta, Pt, Rh, Pd, Ti, Nb and Hf are added to the above-described recording layer 44.

However, with respect to further increase in the recording density in the future, it is predicted that reduction in the size of the core portion 46 of the Co—Cr system will be difficult. Since the superparamagnetism effect becomes remarkable with reduction in the size, recently noted L10 ordered alloys of CoPt, FePt, and FePd are believed to be promising materials in the future. In particular, for example, Japanese Patent Laid-Open No. 2001-273622 proposes a medium capable of resisting the superparamagnetism effect accompanying the reduction in the size of magnetic particles of Co—Cr system, wherein the above-described ordered alloy is made into fine particles, and a film (granular film) is prepared, in which the resulting fine particles are dispersed in a non-magnetic matrix. However, it is important to control the volume distribution of the magnetic materials made into fine particles.

The patterned media is a noteworthy media after the perpendicular magnetic recording. The patterned media is a recording system included in the perpendicular recording. However, in contrast to that described above, information is recorded by the orientation of the magnetization of each magnetic material portion. The magnetic materials are required to have a regular arrangement with some periodicity, and an increase in area is a significant challenge because the preparation is difficult.

With respect to the above-described perpendicular magnetic recording media and the patterned media, there is a problem of variations in the sizes of magnetic materials of each medium regardless of difference in the sizes of magnetic materials between the media.

SUMMARY OF THE INVENTION

It is an object of the present invention to provide a magnetic recording medium including a recording layer, wherein self-organizing structure, that is, a structure produced by anodization of aluminum, or a structure composed of columnar Al portions and a Si or SiGe portion which is disposed surrounding the side surfaces of the columnar Al portions and which contains Si or SiGe as a constituent is used as a base material and, thereby, magnetic materials are allowed to have the shape of a circular cylinder, and uniformity and size reduction of the magnetic materials are achieved simultaneously.

Another object of the present invention is to provide a magnetic recording playback device including the above-described magnetic recording medium.

Another object of the present invention is to provide an information processing device including the magnetic recording playback device.

A first aspect of the present invention is a magnetic recording medium including a recording layer and an electrode layer disposed on a substrate, wherein the recording layer and the electrode layer are disposed in the same plane.

The above-described electrode layer may be disposed adjacently to the end portion of the plane in which the recording layer on the substrate is disposed.

The above-described substrate may be an insulating material.

Preferably, at least one substrate electrode layer satisfying the relationship represented by resistivity ($\Omega$ cm)/film thickness (cm)$\leq$100 ($\Omega$) is disposed between the above-described substrate and the recording layer.

Preferably, the distance between the recording layer and the nearest electrode layer is 3 cm or less.

A matrix surrounding magnetic material portions of the above-described recording layer may contain alumina as a constituent provided by anodization of aluminum.

A matrix surrounding magnetic material portions of the above-described recording layer may contain at least one of Si and Ge or an oxide thereof as a constituent.

The above-described electrode layer may contain aluminum as a constituent. The above-described electrode layer may contain AlSi or AlSiGe as a constituent.

A second aspect of the present invention is a magnetic recording playback device including any one of the above-described magnetic recording media.

A third aspect of the present invention is an information processing device provided with the magnetic recording playback device including any one of the above-described magnetic recording media.

According to the present invention, the electrode layer and the recording layer are disposed in the same plane and, thereby, a magnetic recording medium including the recording layer, in which uniformity and size reduction are achieved simultaneously, can readily be provided. In particular, the present invention is effective in the case where a structure having fine holes and a plating method are used. The electrode layer is disposed adjacently to the end portion of the substrate and, thereby, the arrangement of the electrode layer is allowed to become suitable for actual recording.

Furthermore, the present invention can provide a magnetic recording playback device including the above-described magnetic recording medium and an information processing device including the magnetic recording playback device.

Further objects, features and advantages of the present invention will become apparent from the following description of the preferred embodiments with reference to the attached drawings.

DESCRIPTION OF THE PREFERRED EMBODIMENTS

The present invention will be described below in detail.

A magnetic recording medium of the present invention includes a recording layer and an electrode layer disposed on a substrate, wherein the recording layer and the electrode layer are disposed in the same plane.

<Configuration of Magnetic Recording Medium>

Figure 1:
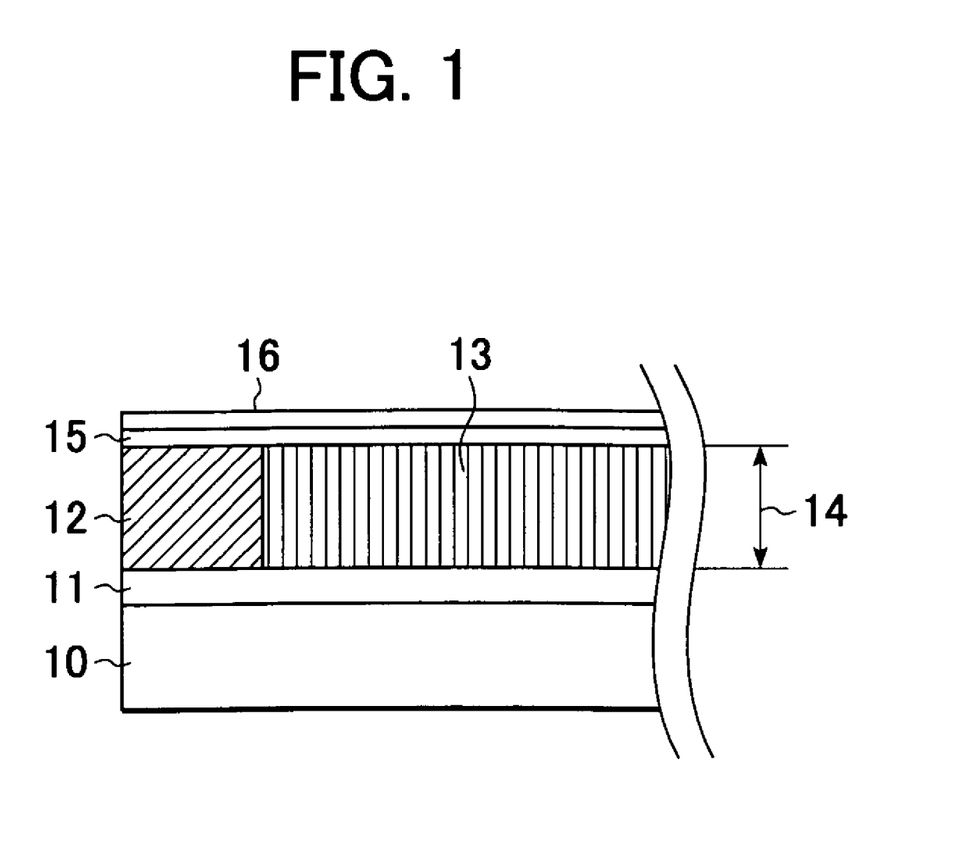
FIG. 1 is a schematic diagram showing an example of a magnetic recording medium according to an embodiment of the present invention.

The magnetic recording medium of the present invention will be described with reference to the drawings. FIG. 1 is a schematic diagram showing the configuration of the magnetic recording medium of the present invention.

In FIG. 1, reference numeral 10 denotes a substrate, reference numeral 11 denotes a substrate electrode layer, reference numeral 12 denotes an electrode layer, reference numeral 13 denotes a recording layer, reference numeral 14 denotes a recording plane, reference numeral 15 denotes a protective layer, and reference numeral 16 denotes a lubricating layer. In the present invention, both the electrode layer 12 and the recording layer 13 are disposed in the recording plane 14. The electrode layer 12 performs the function as an electrode in the formation of the recording layer 13 by an electrodeposition method. This electrode layer 12 is in contact with the substrate electrode layer 11, and the substrate electrode layer 11 satisfying the relationship represented by resistivity ($\Omega$ cm)/film thickness (cm) $\leq 100$ ($\Omega$) serves as a main electrode through the electrode layer 12 during the electrodeposition. Preferably, the distance between the recording layer 13 and the nearest electrode layer 12 is 3 cm or less.

Figure 2A:
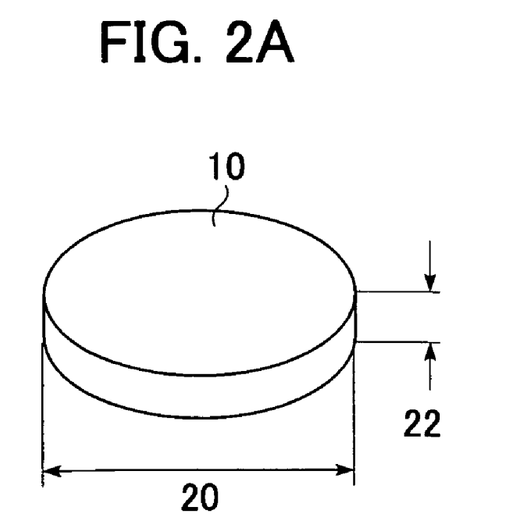
FIGS. 2A and 2B are schematic diagrams of examples of a substrate shape usable for the present invention.
Figure 2B:
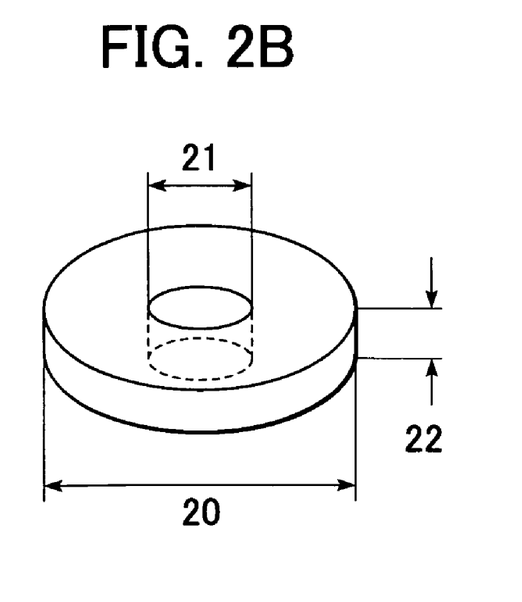

Not only a conductive substrate, but also even an insulating substrate may be suitable as a substrate 10 used for the present invention. In particular, smooth materials, e.g., a glass substrate, a quartz substrate, and a silicon substrate, may be used. Preferably, the substrate 10 has the shape of a circle shown in FIG. 2A, a doughnut shown in FIG. 2B, and the like. In particular, the ranges of the outer diameter R20 of the substrate, the inner diameter r21 of the substrate, and the height H22 of the substrate may be 5 mm<R<100 mm, 0.5 mm<r<50 mm, and 0.1 mm<H<100 mm, respectively.

The recording plane 14 may be disposed on any one of a top surface, a bottom surface, and a side surface of the substrate 10, while not limited to a part thereof. With respect to the positional relationship between the electrode layer 12 and the recording layer 13 disposed in the recording plane 14, preferably, the electrode layer 12 is disposed adjacently to an end portion of the recording plane 14. The end portion is not necessarily covered entirely with the electrode layer 12, and even when a part of the end portion is covered, the function of the electrode layer may be performed. However, from the viewpoint of uniformity, preferably, the electrode layer is disposed symmetrically with respect to the recording layer 13. Each of FIGS. 3A to 3D shows an example of the arrangement of the electrode 12 in the recording plane 14. Preferably, the width L 30 of the electrode layer 12 from the end portion satisfies 0.01 mm<L at this time. In particular, 0.01 mm<L<5 mm is preferable. The electrode 12 may be disposed in at least a part of the recording plane 14, or be disposed over other surfaces as well.

The electrode layer 12 may not serve the function as an electrode, but may be used for the purpose of, for example, protection of the end portion. Therefore, in the recording plane 14, a portion which is not processed into the recording layer 13 may be served as the electrode layer 12. Furthermore, in the case of an insulating substrate, the electrode layer 12 is effective at serving as an electrode, but with respect to an electrically conductive substrate, the electrode layer 12 serves the function of protecting the above-described end portion or preventing concentration of electrode-posited materials on the end portion.

In the present invention, the electrode layer 12 and the recording layer 13 can be independently formed from the same material, and for that purpose, it is effective to use an aluminum film or an AlSi or AlSiGe structure film including columnar aluminum portions, which contain aluminum as a constituent and which stand in the direction perpendicular to the substrate, and a Si or SiGe portion which contains Si or SiGe as a constituent and which is disposed surrounding the side surfaces of the columnar aluminum portions. There are large differences in diameters and periods of fine holes 50 shown in FIGS. 5A and 5B depending on whether a matrix 51 of the structure is alumina or is Si or SiGe.

Figure 5A:
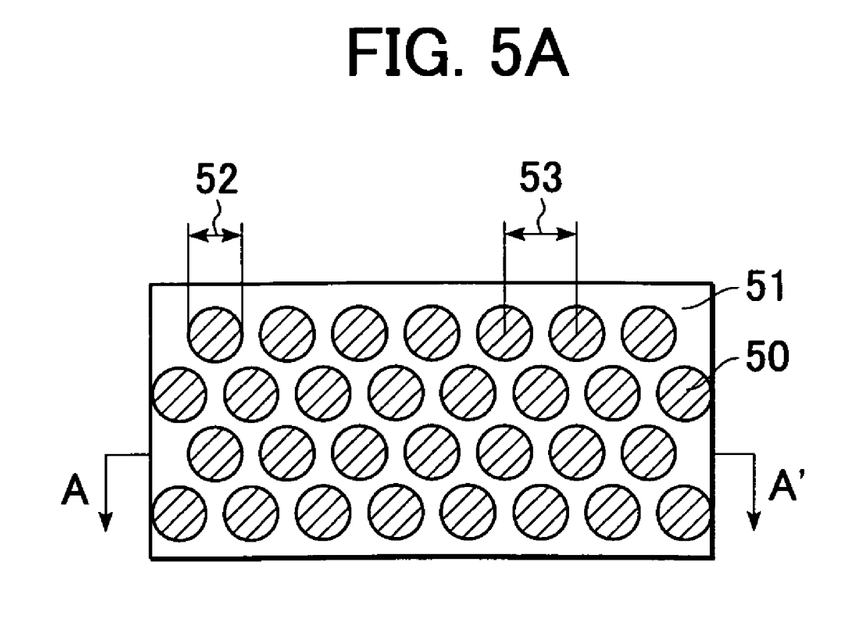
FIGS. 5A and 5B are schematic diagrams of a structure having fine holes.
Figure 5B:
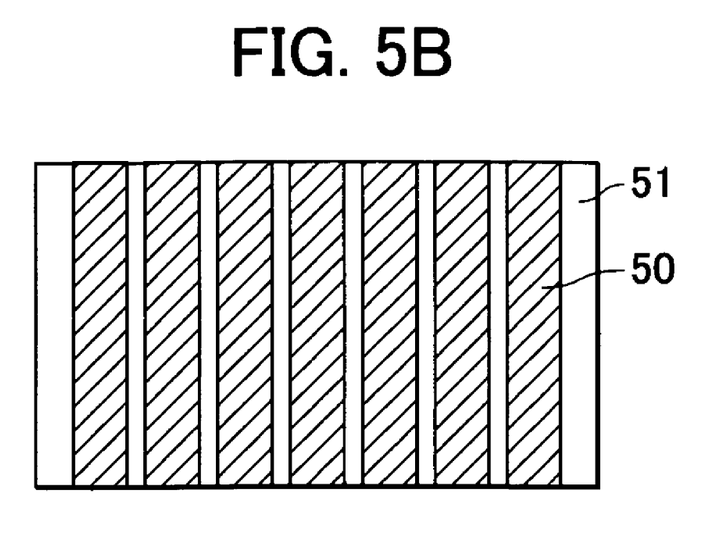

FIGS. 5A and 5B are schematic diagrams of a structure having fine holes. When alumina is used, the electrode layer 12 is an aluminum film itself, and the recording layer 13 is formed by filling a magnetic material in a structure which is formed by anodization of aluminum and which is composed of fine holes 50 and alumina surrounding the fine holes 50.

The characteristics of the anodization of aluminum will be described below.

A portion required to include fine holes is immersed in an aqueous solution of phosphoric acid, oxalic acid, sulfuric acid, or the like, this is served as an anode, and a voltage is applied, so that holes are formed through self-organization. The distance 53 between the holes formed at this time is determined depending on the applied voltage, and the relationship of 2.5 nm×voltage (V) is known. However, the distance 53 between the holes at a minimum period is in the order of 15 nm. At the same time, the diameter 52 of the hole is about 12 to 13 nm at a minimum.

The surface of the aluminum film is regularly provided with dents, these are taken as starting points, and holes are formed therefrom while being regularly arranged into the shape of a honeycomb or a square. In particular, there is a high possibility with respect to the patterned media.

Figure 6:
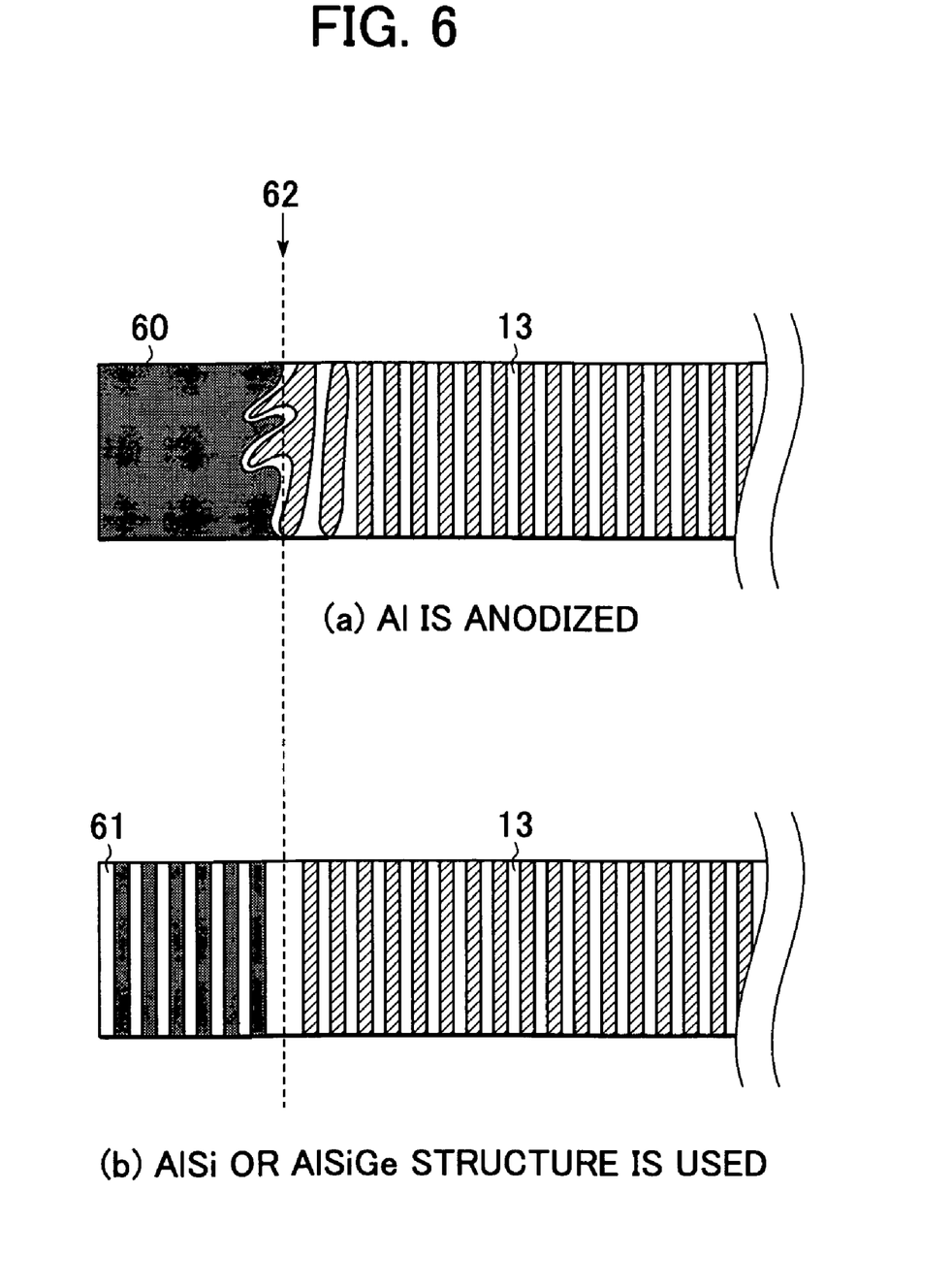
FIG. 6 is a schematic diagram showing boundaries of electrode layers and recording layers.

Regarding the above description, as shown in FIG. 6(a), the boundary portion 62 between an electrode layer (Al) 60 and a recording layer 13 is not necessarily clear, and a part of the electrode layer (Al) 60 may be eroded due to the formation process of the recording layer 13. FIG. 6(a) is a schematic diagram showing one example, and the form is not limited to that shown in the drawing.

Specific examples of the structure having fine holes produced by the above-described anodization of aluminum are described in Japanese Patent Laid-Open No. 11-200090, for example.

When the AlSi or AlSiGe structure including columnar aluminum portions which contain aluminum as a constituent and which stand in the direction perpendicular to the substrate and a Si or SiGe portion which contains Si or SiGe as a constituent and which is disposed surrounding the side surfaces of the columnar aluminum portions is used, an electrode layer (AlSi or AlSiGe) is an AlSi or AlSiGe structure itself, as shown in FIG. 6(b). However, it is noted that there is no problem in the function as the electrode even when the structure of the electrode layer (AlSi or AlSiGe) is changed due to a heat treatment and the like in a later process. With respect to the recording layer 13, the AlSi or AlSiGe structure is immersed in an acid or alkaline solution which etches the aluminum portion of the AlSi or AlSiGe structure and does not etch the Si or SiGe portion and, thereby, is processed into a structure composed of fine holes 50 and Si or SiGe surrounding the fine holes 50. Subsequently, a magnetic material is filled in, so that the recording layer 13 can be prepared.

The characteristics of the AlSi or AlSiGe structure will be described below.

In the structure, the columnar Al portions stand straight in the direction perpendicular to the substrate, and the Si or SiGe portion serving as a matrix 51 of the structure is disposed surrounding the side surfaces of the circular cylinders, as shown in FIG. 5. The Al portion slightly contains Si or SiGe and the Si or SiGe portion slightly contains Al. In order to form this structure, preferably, simultaneous film formation of Al and Si or SiGe is performed in the non-equilibrium state. The columnar Al portions stand straight in the direction perpendicular to the substrate, and are immersed in an acid, e.g., phosphoric acid, or alkali which does not dissolve Si or SiGe and dissolves the columnar aluminum portions, so that, only the columnar aluminum portions are dissolved and removed. A plurality of acids and alkalis, e.g., phosphoric acid, sulfuric acid, and ammonium water, are suitable.

The columnar aluminum portions may also be removed by anodization of this AlSi or AlSiGe structure in an aqueous solution of, e.g., sulfuric acid. At this time, the Si or SiGe portion is oxidized during anodization, and is converted to $(Al_x(Si_yGe_{1-y})_{1-x})_zO_{1-z}$ where the range of x is $0<x\leq0.2$ and, preferably is $0<x\leq0.1$. Essentially, the range of y is $0\leq y\leq 1$, and the case of Si alone or Ge alone is included. The oxidized state is within the range of $0.334\leq z\leq 1$, and the state of not being oxidized is included. The oxidation may be performed by anodization or the like, and preferably, the anodization is terminated within 30 sec to 60 sec after the fine holes reach the substrate layer. Alternatively, the anodization may be performed until the current of the anodization reaches a minimum value. The oxidation may be performed by annealing in an oxygen atmosphere. With respect to the AlSi or AlSiGe structure from which Al has been removed, the diameters 52 of the holes are within the range of 1 nm to 15 nm and the distances between the holes 53 are within the range of 3 nm to 20 nm, although depending on the composition. In this manner, the walls surrounding fine holes 50 are composed of Si, SiGe, or an oxide thereof depending on the means of removal of the Al portions.

Specific examples of the above-described structure containing AlSi or AlSiGe as a constituent are described in Japanese Patent Application No. 2002-340944, for example.

Preferably, the material for the above-described substrate electrode layer 11 satisfies the relationship represented by resistivity (Ω cm)/film thickness (cm)≦100 (Ω). In order to control the orientation of the substrate electrode layer 11, (001)-oriented MgO may be inserted. In particular, preferably, the orientation of the substrate electrode layer 11 is appropriately selected from (111) and (001) in order to control the orientation of the magnetic material to be filled in the holes. Preferably, the (111) orientation of the fcc structure is used for the substrate electrode layer 11 in order to orient the c axis of hcp-Co in the direction perpendicular to the substrate, and preferably, the substrate electrode layer 11 has a crystal plane composed of square-like array parallel to the substrate surface in order to orient the c axis of L10 ordered alloy layer of MPt (M=Co, Fe, or Ni) in the direction perpendicular to the substrate. In particular, it is preferable to use the (001) orientation of the fcc structure.

With respect to the above-described substrate 10, preferably, glass, Al, carbon, plastic, Si, and the like are used as the substrate 10. With respect to an Al substrate, desirably, a NiP film is formed beforehand as a substrate layer by a plating method or the like in order to ensure the hardness.

It is effective to form a soft magnetic layer serving as a backing layer between the substrate 10 and the substrate electrode layer 11. A film primarily containing $Ni_tFe_{1-t}$ can be used as the backing layer. Desirably the range of t is 0.65 to 0.91, and furthermore, Ag, Pd, Ir, Rh, Cu, Cr, P, B, and the like may be contained partially. In addition, FeCo, FeTaC, and soft magnetic materials which are amorphous materials may be adopted.

The top surface of the magnetic recording medium is subjected to precision polishing by the use of diamond slurry, or the like, and Rms (root-mean-square) thereof is 1 nm or less. Preferably, the protective layer 15 is further formed on the surface, and it is effective to use carbon, or other high-hardness non-magnetic materials, e.g., carbide and nitride, in order to provide abrasion resistance to the friction against a head.

Preferably, perfluoropolyether (PFPE) is applied as the lubricating layer 16.

Figure 7:
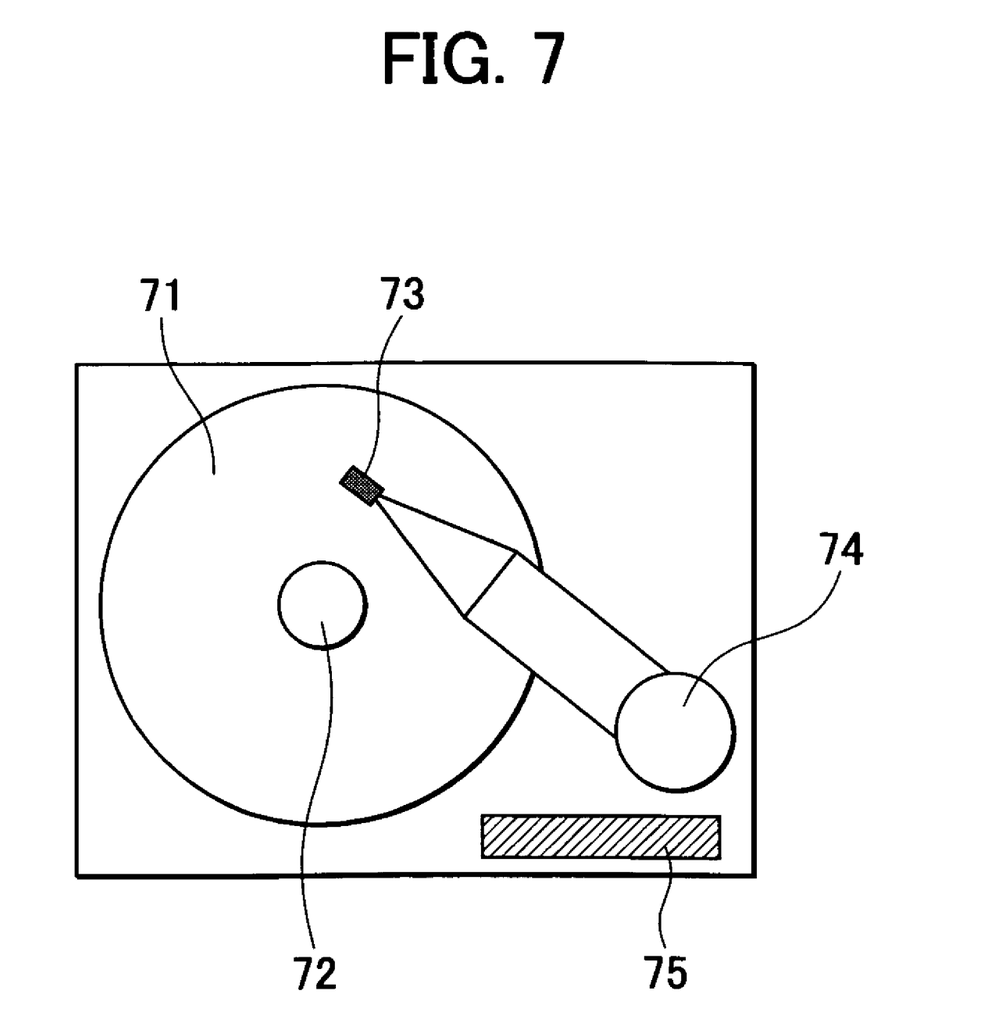
FIG. 7 is a schematic diagram showing a magnetic recording playback device including a magnetic recording medium of the present invention.

The magnetic recording medium of the present invention is effective as a perpendicular magnetic recording medium. In order to use the magnetic recording medium as a magnetic recording playback device, a reading-writing magnetic head 73, a magnetic head driving section 74, e.g., a motor, a signal processing section 75, a dust-resistant case, and the like must be incorporated besides the above-described magnetic recording medium 71, as shown in FIG. 7. However, in the magnetic recording playback device, the driving of the magnetic recording medium 71 is not simply limited to the rotation, and the driving of the magnetic head 73 is not simply limited to slide on the circumference.

Figure 8:
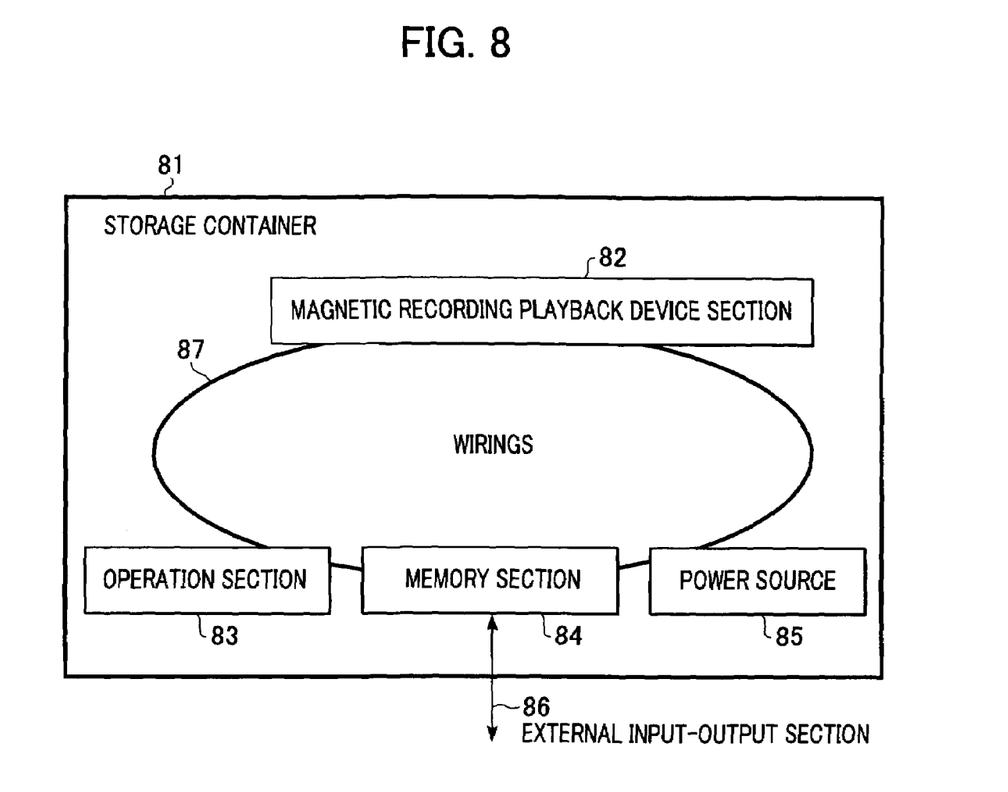
FIG. 8 is a conceptual diagram of an information processing device including a magnetic recording playback device of the present invention.

In order to use the above-described magnetic recording playback device as an information processing device, as shown in FIG. 8, the information processing device must be formed, in which a memory section 84, an operation section 83, an external input-output section 86, a power source 85, and wirings 87 connecting therebetween, besides a magnetic recording playback device section 82, are contained in a storage container 81. In the information processing device, wirings may be either wired or wireless.

EXAMPLES

The present invention will be described below with reference to examples.

Example 1

The present Example shows that a recording layer and an electrode layer are disposed in the same plane.

A substrate in which conductive aluminum was plated with NiP and an insulating glass substrate were prepared. Films of Pt of 20 nm and Ti of 1.5 nm were sequentially formed as substrate electrode layers on these substrates and, succeedingly, Al films of 100 nm were formed. These films were formed by a sputtering method. However, any other method may be used as long as a smooth film can be produced. The substrate electrode layers were composed of two layers because aluminum was anodized stably.

Anodization was performed by application of a voltage of 20 V in a 0.3 mol/l aqueous solution of sulfuric acid at 10° C. while an electrode portion was a part of the substrate. As a result, there was no difference between the substrate, in which aluminum was plated with NiP, and the insulating glass substrate, the electrode portion remained as the aluminum film, and formation of fine holes were observed in the other portion anodized in the aqueous solution of sulfuric acid, as shown in FIG. 6(*a*). The bottoms of fine holes reached the substrate electrode layer, and a magnetic material was able to be filled in by plating without any pretreatment.

Subsequently, Co was electrodeposited, portions overflowed from the holes were polished and, thereby, a film in which myriad circular cylinders of Co were distributed in the alumina matrix was formed, so that the formation of the recording layer was ensured. At this time, no difference depending on the substrates was observed. With respect to the substrate in which aluminum was plated with NiP, the recording layer was able to be formed even when the electrode layer and the recording layer were not in the same plane, but the disposition of the electrode layer and the recording layer in the same plane was effective at avoiding concentration of plated materials on the end portion of the substrate.

In particular, with respect to the combination of the structure having fine holes and the plating, it was shown that the recording layer was readily formed by disposing the electrode layer and the recording layer in the same plane.

Example 2

The present Example relates to the positional relationship between the recording layer and the electrode layer in the recording plane.

Circular and doughnut-type glass substrates and a circular cylinder-type glass were prepared. Films of Pt of 20 nm and Ti of 1.5 nm were formed as substrate electrode layers on these substrates and, subsequently, Al films of 100 nm were formed. These films were formed by a sputtering method. However, any other method may be used as long as a smooth film can be produced. The substrate electrode layers were composed of two layers because aluminum was anodized stably.

Figure 3A:
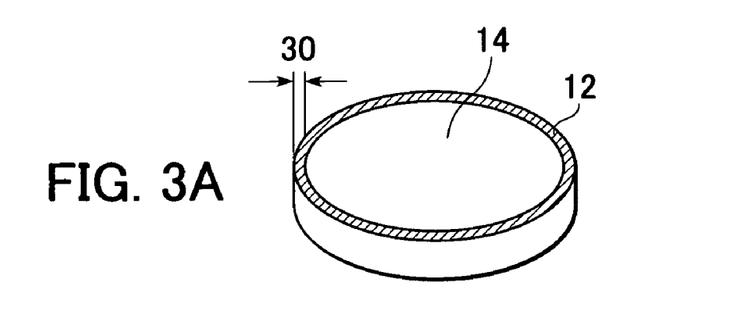
FIGS. 3A to 3D are schematic diagrams showing arrangement examples of an electrode layer disposed in a recording plane of the present invention.
Figure 3B:
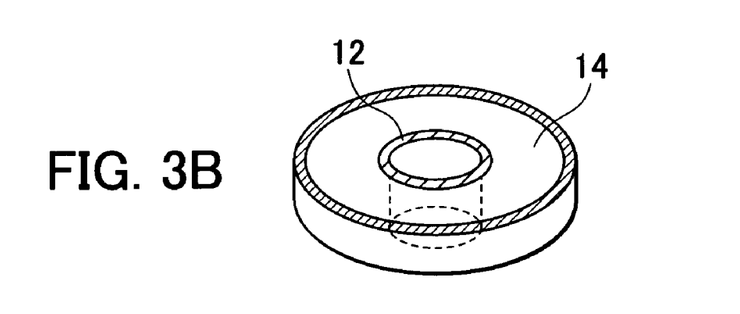

The portion on the rim of the circular glass substrate was taken as an electrode, and anodization was performed under the condition as in Example 1. Consequently, as shown in FIG. 3A, the formation of an electrode layer portion made of aluminum and an alumina portion having fine holes was observed. Furthermore, Co was filled in and, thereby, the portion having holes was allowed to serve the function as a recording layer.

The portion on the inner rim of the doughnut-type glass substrate was taken as an electrode, the outer rim was enclosed for protection and, thereafter, anodization was performed. Consequently, the arrangement shown in FIG. 3B was observed. In a manner similar to that in the above description, the electrode layers served the function as the electrodes for anodization and electrodeposition with no problem. Co was filled in and, thereby, it was ensured that a recording layer was able to be formed.

Figure 3C:
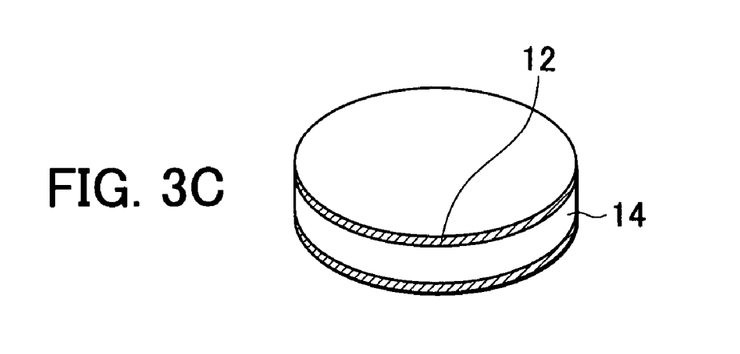
Figure 3D:
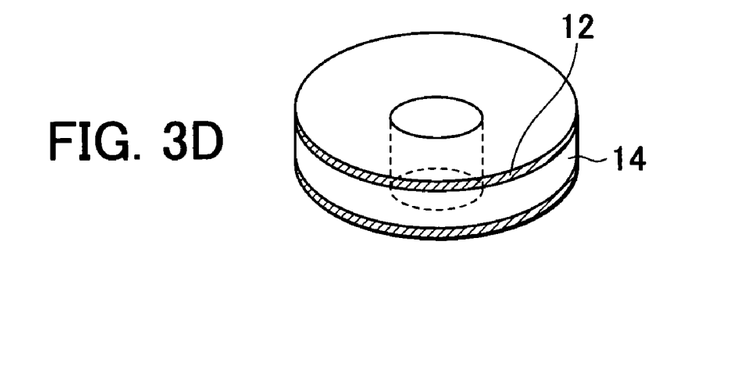

Finally, it was attempted to make the side surface of the circular cylinder-type glass into a recording plane, and it was observed that the recording layer and the electrode layer were formed, as shown in FIG. 3C.

In this manner, it was ensured that the electrode layer was able to be disposed at the end portion of the recording plane. This is a preferable embodiment from the viewpoint of the electrode layer arrangement which does not hinder the actual recording. However, the arrangement of the electrode layer is not limited to the same arrangement as in the present Example.

Example 3

The present Example relates to the structure serving as the matrix of the recording layer.

Substrate electrode layers composed of Pt of 20 nm and Ti of 1.5 nm were formed on a doughnut-type glass substrate, and three types of sample, that is, aluminum of 100 nm, an AlSi composite film of 50 nm, and an AlSiGe composite film of 50 nm, were prepared therefrom.

Aluminum was anodized by application of a voltage of 20 V in a 0.3 mol/l aqueous solution of sulfuric acid at 10° C. Consequently, an aluminum portion was converted into a film composed of alumina walls and fine holes through oxidation and dissolution. At that time, the average diameter of fine holes was in the order of 30 nm, and the average hole distance was 50 nm. In particular, with respect to the anodization of aluminum, the hole distance was proportionate to the applied voltage, although the hole distance decreased up to the order of 15 nm even at a minimum. However, with respect to the use as a patterned media, the film prepared by the anodization of aluminum had an advantage that holes was able to be arranged in the shape of a honeycomb by self organization or by being regularly provided with dents in early stages, and it was ensured that the film had the capability to reach about 3 Tbit/inch2 at an average hole distance of 15 nm.

The AlSi composite film and the AlSiGe composite film were immersed in 5 percent by weight phosphoric acid solution, so that the Al portion was removed. At that time, it was observed that the AlSi composite film was converted to a film composed of walls containing partially oxidized Si as a constituent and fine holes, and the AlSiGe composite film was converted to a film composed of walls containing partially oxidized SiGe as a constituent and fine holes. Here, the average diameters of the above-described two types of fine holes were 8 nm and 12 nm, respectively, and the average hole distances were 10 nm and 15 nm, respectively. Although the distribution of the diameters of these holes is small, the arrangement of the holes is different from that in the above description, and the holes are arranged somewhat randomly. Therefore, a medium capable of high-density magnetic recording can be provided by forming a layer of L10 ordered alloy, e.g., MPt (M=Co, Fe, or Ni) in the hole, wherein circular cylinder-shaped magnetic materials are dispersed in a non-magnetic material and, thereby, the medium is resistant to thermal fluctuations.

As described above, with respect to the aluminum film and the AlSi composite film or the AlSiGe composite film, the electrode layer and the recording layer originate from the same material, are readily formed in the same plane. Furthermore, it is shown that an effective magnetic recording medium can be provided by filling a magnetic material in the fine holes. However, the present invention is not limited to the above-described two types of structure.

Example 4

In the present Example, a magnetic recording device having the configuration roughly shown in FIG. 7 can be constructed.

With respect to the magnetic recording medium of the present invention, the electrode layer and the recording layer are disposed in the same plane and, thereby, the recording layer can be readily formed while the electrode layer is disposed not to hinder recording. Consequently, the magnetic recording medium of the present invention is incorporated into a device, as shown in FIG. 7, composed of a magnetic recording medium driving section 72, a magnetic head 73, a magnetic head driving section 74, and a signal processing section 75 and, thereby, a magnetic recording device can be formed. In the above-described example, the magnetic recording medium of the present invention includes the doughnut-shaped substrate. However, other shapes, as shown in FIGS. 2A and 2B and FIGS. 3A to 3D, may be used. Therefore, the driving of the magnetic recording medium 71 is not simply limited to the rotation, and the driving of the magnetic head 73 is not simply limited to slide on the circumference according to the present Example.

Example 5

The present Example relates to an information processing device.

With respect to the above-described magnetic recording playback device section 82 described in Example 4, input and output of the information can be performed and, therefore, as shown in FIG. 8, the information processing device can be formed, in which the above-described device section, a memory section 84, an operation section 83, an external input-output section 86, a power source 85, and wirings 87 connecting therebetween are contained in a storage container 81.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A magnetic recording medium comprising: a recording layer and an electrode layer disposed on an insulating substrate, wherein the recording layer and the electrode layer are disposed in the same plane and wherein at least one substrate electrode layer satisfying the relationship represented by resistivity ($\Omega$cm)/film thickness (cm) $\leq 100$ ($\Omega$) is disposed between the insulating substrate and the recording layer.

2. The magnetic recording medium according to claim 1, wherein the electrode layer is disposed adjacently to the end portion of the plane in which the recording layer on the substrate is disposed.

3. The magnetic recording medium according to claim 1, wherein the distance between the recording layer and the nearest electrode layer is 3 cm or less.

4. The magnetic recording medium according to claim 1, wherein a matrix surrounding magnetic material portions of the recording layer comprises alumina as a constituent provided by anodization of aluminum.

5. The magnetic recording medium according to claim 1, wherein a matrix surrounding magnetic material portions of the recording layer comprises at least one of Si and Ge or an oxide thereof as a constituent.

6. The magnetic recording medium according to claim 1, wherein the electrode layer comprises aluminum as a constituent.

7. The magnetic recording medium according to claim 1, wherein the electrode layer comprises AlSi or AlSiGe as a constituent.

8. A magnetic recording playback device comprising the magnetic recording medium according to claim 1.

9. An information processing device including a magnetic recording playback device comprising the magnetic recording medium according to claim 1.

* * * * *